United States Patent
Aoki

(10) Patent No.: US 7,630,163 B2
(45) Date of Patent: Dec. 8, 2009

(54) STORAGE DEVICE AND SEEK CONTROL METHOD

(75) Inventor: Takahiro Aoki, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 0 days.

(21) Appl. No.: 12/197,804

(22) Filed: Aug. 25, 2008

(65) Prior Publication Data

US 2009/0080103 A1    Mar. 26, 2009

(30) Foreign Application Priority Data

Sep. 21, 2007    (JP)    ............................. 2007-245166

(51) Int. Cl.
- *G11B 5/596* (2006.01)
- *G11B 21/02* (2006.01)
- *G11B 5/03* (2006.01)

(52) U.S. Cl. .................. 360/78.04; 360/77.02; 360/75; 360/66

(58) Field of Classification Search ........................ None
See application file for complete search history.

(56) References Cited

U.S. PATENT DOCUMENTS

| | | | | |
|---|---|---|---|---|
| 4,949,201 A | * | 8/1990 | Abed | 360/78.07 |
| 5,872,674 A | * | 2/1999 | Eddy | 360/78.09 |
| 5,999,361 A | * | 12/1999 | Kim | 360/78.09 |
| 6,166,876 A | | 12/2000 | Liu | |
| 6,636,375 B1 | * | 10/2003 | Ding et al. | 360/77.02 |
| 7,253,989 B1 | * | 8/2007 | Lau et al. | 360/78.04 |
| 7,561,373 B2 | * | 7/2009 | Cho | 360/78.04 |

FOREIGN PATENT DOCUMENTS

JP    A 3-237667    10/1991

\* cited by examiner

*Primary Examiner*—Andrew L Sniezek
(74) *Attorney, Agent, or Firm*—Greer, Burns & Crain, Ltd.

(57) ABSTRACT

A storage device includes a storage unit, a timer unit and a bias current applying unit. The storage unit stores, in advance, a value of a waiting time until application of a bias current to the driving unit to eliminate an external force applied to an actuator after completion of positioning, and a value of a bias current to be applied to the driving unit after the elapse of the waiting time, in association with a track position. The timer unit reads the waiting time from the storage unit and counts an elapse of the waiting time. The bias current applying unit reads the bias current value from the storage unit and applies the bias current to the driving unit after the elapse of the waiting time.

8 Claims, 8 Drawing Sheets

STORAGE DEVICE AND SEEK CONTROL METHOD

BACKGROUND OF THE TECHNIQUE

1. Field of the Technique

The present technique relates to a positional control technique for seeking and fixing a head of a storage device to a predetermined position on a recording medium.

2. Description of the Related Art

Magnetic storage devices read/write data from/to a magnetic disk with a magnetic head.

To read/write data, the magnetic head position should be adjusted to a predetermined track on the magnetic disk. For that purpose, servo information is recorded in a servo sector in advance with a servo track writer etc., the servo sector being provided between data sectors on the track. At the time of reading/writing data from/to the magnetic disk, the magnetic head is sought to a target track position based on a current position.

After having reached the target track position, the magnetic head is positioned to the center of the track.

After the completion of the positioning process, data is read/written.

The positioning process is carried out based on the servo information read with the magnetic head. However, the magnetic head position varies due to an influence of an external force applied onto an actuator equipped with the magnetic head, for example, a wind pressure, a flexible cable, and the like. To eliminate the influence, a bias current that can eliminate the external force is measured in advance, and the measured value is stored in a table. Upon the positioning process, the bias current is applied to a voice coil motor for driving the actuator to thereby adjust the variation in magnetic head position.

One conceivable calibration measurement of a bias current to adjust the position variation is to measure a bias current just after a positioning process. Resultant bias current values are summarized in a table based on the measurement result. However, in the case of measuring a bias current just after a positioning process, the measured bias current value might be variable, not stable due to a residual vibration. For example, since a vehicle-mounted magnetic storage device or the like has a wide operating temperature range of −30° C. to 85° C., a bias current value measured for calibration purposes just after the completion of seek might vary especially at a low temperature.

Therefore, there is a difference between the varying bias current value and a correct bias current value.

SUMMARY

It is an object of the present technique to provide a storage device, which is directed to apply a bias current measured at an appropriate timing after a positioning process, at an appropriate timing after the positioning process.

A storage unit of a storage device according to the present technique stores, in advance, a value of a waiting time until application of a bias current for eliminating an external force applied to an actuator to a driving unit upon the completion of a positioning process, and a value of a bias current to be applied to the driving unit after the waiting time, in association with a track position.

The storage device drives an actuator equipped with a head by a driving unit to seek the head to a target track on a storage medium to position the head to the track. The storage device includes a timer unit for reading a waiting time from the storage unit to check an elapse of the waiting time, and a bias current applying unit for reading the bias current value from the storage unit and applying a bias current to the driving unit after the elapse of the waiting time.

DESCRIPTION OF THE PREFERRED EMBODIMENTS

Figure 1:
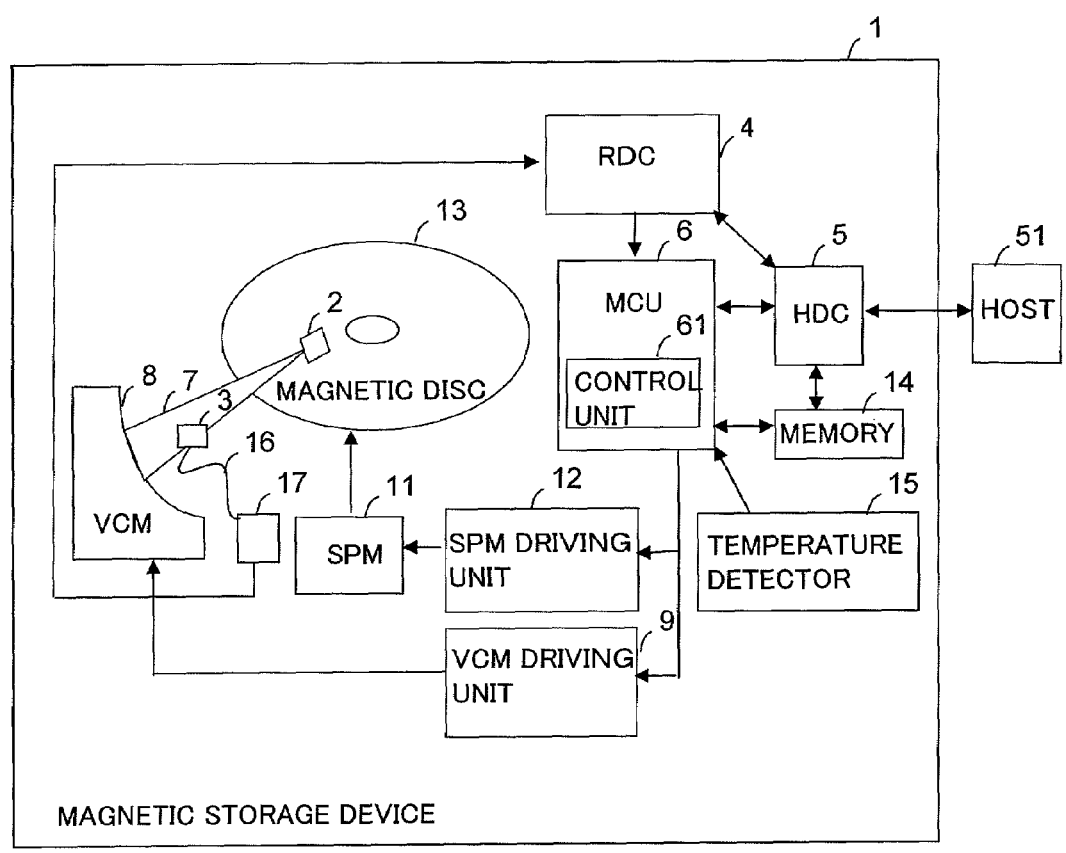
FIG. 1 is a diagram of a magnetic storage device.

FIG. 1 is a diagram of a magnetic storage device that exemplifies a storage device of the resent technique. A magnetic storage device 1 includes a magnetic head 2, a preamplifier IC (head IC) 3, a read channel 4 (hereinafter referred to as "RDC 4"), a hard disk controller 5 (hereinafter referred to as "HDC 5"), a microcontroller unit 6 (hereinafter referred to as "MCU 6"), an actuator 7, a voice coil motor 8 (hereinafter referred to as "VCM 8"), a VCM driving unit 9, a spindle motor 11 (hereinafter referred to as "SPM 11"), an SPM driving unit 12, a magnetic disk 13, a memory 14, a temperature detector 15, a flexible cable 16 (hereinafter referred to as "FPC 16"), and a fixture 17.

The magnetic head 2 writes/reads data to/from the magnetic disk 13. The magnetic head 2 is equipped with a write head and a read head, which are integrated.

The head IC 3 includes a read amplifier. The read amplifier converts a signal of the read head of the magnetic head 2 into a voltage and supplies the voltage to the RDC 4 as a read signal. A write driver drives the write head in accordance with a write signal from the RDC 4. In addition, the head IC 3 includes a head selector circuit for selecting each head.

The RDC 4 sends demodulates the read signal from the head IC 3 into read data and sends the read data to the HDC 5. In addition, the RDC 4 performs code modulation to write a write data signal from the HDC 5 onto the magnetic disk 13. The code-modulated write signal is sent to the head IC 3. Further, the RDC 4 includes a servo demodulating unit to extract a servo address signal, a burst signal, and the like from a read signal of servo information recorded at regular pitches along a track on a recording surface of the magnetic disk, and sends these signals to the MCU 6.

The HDC 5 receives a write command or a read command from a host 51. In the case of writing data to the magnetic disk 13 in response to the write command, the HDC 5 sends write data to the RDC 4. In the case of reading data from the magnetic disk 13 in response to the read command, the HDC 5 obtains read data from the RDC 4 and sends the data to the host 51.

The MCU 6 includes a control unit 61 that executes control over the magnetic storage device 1 inclusive of servo control and read/write control on an operation of reading/writing data from/to the magnetic disk 13.

The actuator 7 is provided with the magnetic head 2 and driven by the VCM 8. The VCM 8 drives the actuator 7 so as to position the magnetic head 2 to a target track position on the magnetic disk 13 designated by the MCU 6.

The VCM driving unit 9 drives the VCM 8 based on a drive signal of the MCU 6. The SPM 11 is a spindle motor. The motor runs at a constant rotational speed, for example, 5400 rpm (rpm/min) with the magnetic disk 13 being attached to a rotating shaft.

The SPM driving unit 12 drives the SPM 11 based on a drive signal of the MCU 6. The magnetic disk 13 is a storage medium for storing servo information for positioning the magnetic head 2 and user data.

The memory 14 stores data about a temperature, a track, a waiting time, and a bias current.

The temperature detector 15 measures the internal temperature of the magnetic storage device 1 and informs the MCU 6 of the measured value. The FPC 16 is a cable for sending a read/write signal from the magnetic head 2 to the RDC 4 by way of the fixture 17. Along with movement of the magnetic head 2 on the magnetic disk 13, a spring tension is produced in accordance with a curve of the FPC 16. The spring tension leads to an external force that hinders alignment of the magnetic head 2 to the center of the track of the magnetic disk 13.

Figure 2:
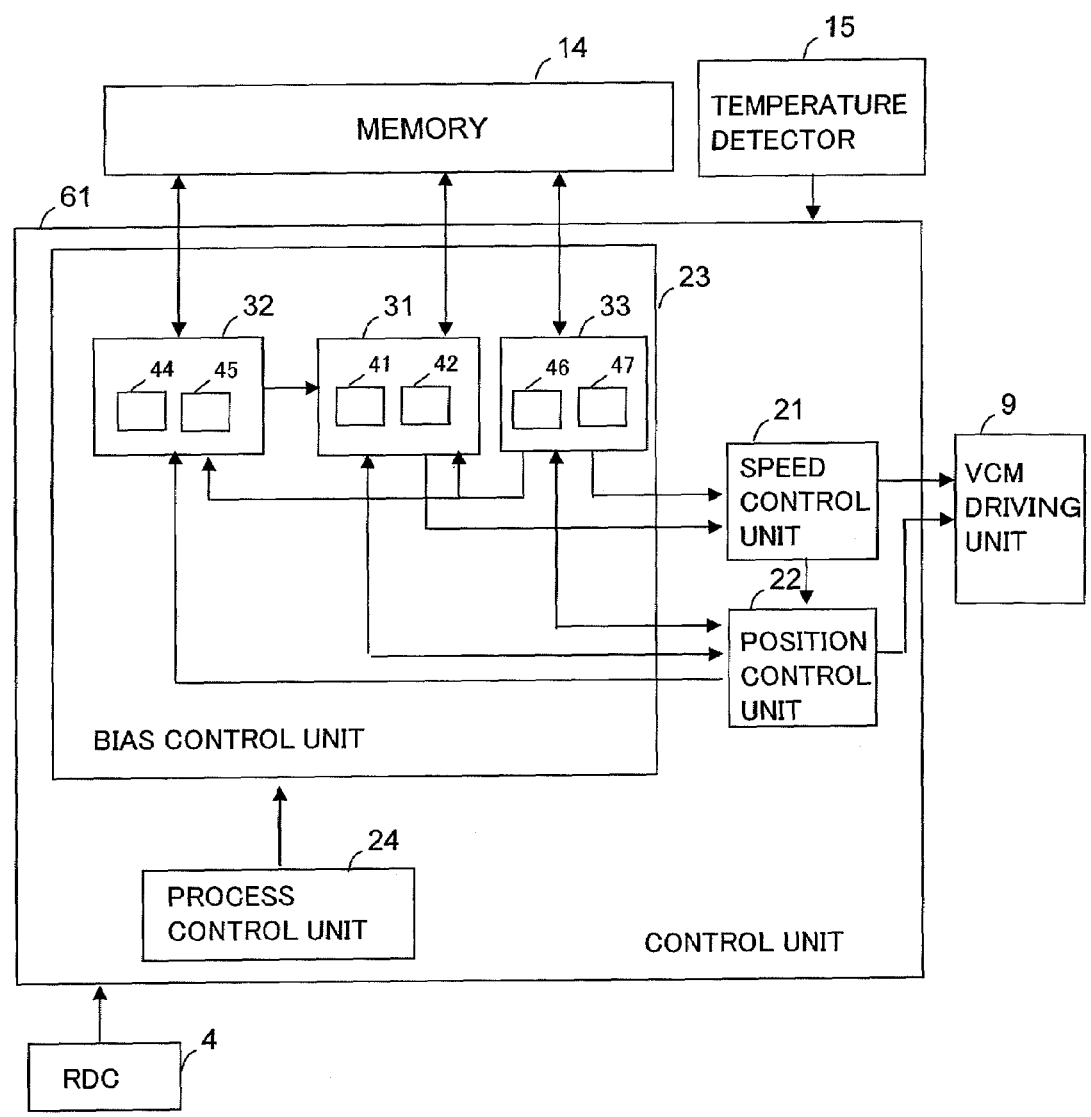
FIG. 2 is a diagram of a control unit.

FIG. 2 is a diagram of a control unit.

The control unit 61 of the MCU 6 performs processing functions of a speed control unit 21, a position control unit 22, a bias control unit 23, a process control unit 24, and the like in accordance with programs.

The speed control unit 21 performs movement control so as to move the magnetic head 2 to a target track on the magnetic disk 13 as the VCM 8 drives the actuator 7. This control is executed while changing speed modes of an accelerating mode, a constant-speed mode, and a decelerating mode. In the accelerating mode, a current is applied to increase a speed. In the constant-speed mode, a speed is kept constant. In the decelerating mode, a current is supplied in opposite direction to that in the accelerating mode to thereby reduce a speed to zero toward a target position. If a seek distance is short, the constant-speed mode is not set.

When the magnetic head 2 approaches the target track through the movement control, positioning control is executed to position the magnetic head 2 to the center of the track.

If the magnetic head 2 moves and reaches the target track, the position control unit 22 drives the VCM 8 to control the position of the actuator 7 so that a deviation of the magnetic head 2 from the center of the track falls within a predetermined threshold (hereinafter referred to as "slice") range. After the completion of seek, the position control unit 22 informs the bias control unit 23 of the completion. In response to an instruction to apply a bias current from the bias control unit 23, a bias current is applied to the VCM driving unit 9.

The bias control unit 23 includes a bias current control unit 31, a waiting time control unit 32, and a performance control unit 33.

The bias current control unit 31 has a measurement mode for measuring a bias current at a manufacture stage in the factory, and an operating mode for general operations. The bias current control unit 31 includes a bias current measurement unit 41 used for processing in the measurement mode, and a bias current applying unit 42 used for performance control processing in the measurement mode and processing in the operating mode.

In the measurement mode, the bias current measurement unit 41 measures a bias current after the completion of seek and stores the measured value in the memory 14.

The bias current refers to a current that cancels an external force applied to the actuator 7. The external force means a wind pressure accompanying rotation of the disk or a force of spring tension of the FPC 16 connecting the magnetic head 2 and the MCU 6 or other such circuits.

Upon measuring a bias current, a bias current value is measured after the position control unit 22 completes seek. At the completion of seek, the magnetic head 2 is positioned in a predetermined slice range from the track center. Thus, a value of a current supplied to the VCM 8 is ideally zero. Therefore, if any current is required to keep the magnetic head 2 within the predetermined slice range from the track center, the current is a bias current for cancelling an external force. Further, a bias current is measured for a predetermined track at five sets of temperature −30° C., 0° C., 25° C., 60° C., and 85° C., for example.

To describe measurement of a performance in the operating mode and the measurement mode, in the case of seeking the magnetic head 2 to a predetermined track, the bias current applying unit 42 determines a bias current value enough to cancel out an external force based on a temperature and a seek distance with reference to data in the memory 14. The bias current applying unit 42 applies the determined current to the VCM driving unit 9. At this time, if the memory 14 stores no data about a target track position, linear interpolation is executed to determine a bias current value.

Further, if receiving a notification to stop current application to the VCM driving unit 9 from the waiting time control unit 32 at the time of applying a bias current, the bias current applying unit 42 stops the application of a bias current. Then, if receiving a notification to allow the current application from the waiting time control unit 32, the bias current applying unit 42 starts the application of a bias current.

The waiting time control unit 32 includes a time measurement unit 44 used for processing in the measurement mode to measure a period from the completion of seek to convergence of residual vibration at the manufacture stage in the factory, and a timer unit 45 used for performance control processing in the measurement mode and processing in the operating mode for general operations.

In the measurement mode, the time measurement unit 44 monitors such head movement that a head position signal gets out of the slice range due to vibration during a track-following operation after the completion of seek and then converges into the slice range. After that, the time measurement unit 44 measures a period from the completion of seek to the convergence of the head position signal as a waiting time by use of a timer.

To measure the period, the magnetic head 2 is sought from the outermost position to the innermost position at regular pitches. At this time, a waiting time is measured at each track position. The waiting time is measured with the disk being turned round in the track-following state.

The waiting time is measured in each track position at five sets of temperature −30° C., 0° C., 25° C., 60° C., and 85° C., for example. The waiting time is measured for each seek distance in each track position.

To describe the measurement of a performance in the operating mode or the measurement mode, the timer unit 45 reads a waiting time from the memory 14. Next, the timer unit notifies the bias current control unit 31 to stop bias current application to the VCM 8 and in addition, counts a predetermined time. After the elapse of the predetermined time, the timer unit 45 notifies the bias current control unit 31 to restart bias current application to the VCM driving unit 9.

The performance control unit 33 performs control to measure a performance.

The performance control unit 33 includes an elapsed time measurement unit 46, and a comparator unit 47. The elapsed time measurement unit 46 measures an elapsed time from when the magnetic head 2 is sought from an initial track to a target track in a direction from the outermost position to the innermost position at regular pitches until a predetermined sector is detected, plural times. At this time, measured values stored in the memory 14 are used as a bias current and a waiting time. The performance is measured at five sets of temperature −30° C., 0° C., 25° C., 60° C., and 85° C., for example.

The comparator unit 47 compares an elapsed time measured with a first measurement method and an elapsed time measured with a second measurement method. A comparison result is sent to the process control unit 24.

The elapsed time measured with the first measurement method indicates the sum of a movement time of the magnetic head 2 from the initial track to the target track, an alignment time, and a waiting time until movement to a predetermined sector. As for the elapsed time measured with the first measurement method, a preset value is used as a reference value. In the first measurement method, a bias current is applied to the VCM driving unit 9 just after the completion of seek from the initial track to the target track. As for the bias current value, a value measured just after the completion of seek to a predetermined track is used.

The elapsed time measured with the second measurement method indicates the sum of a movement time of the magnetic head 2 from the initial track to the target track, an alignment time, a waiting time until bias current application, and a waiting time until movement to a predetermined sector.

The process control unit 24 controls each measurement processing in the measurement mode and processing in the operating mode. In the measurement mode, the process control unit 24 instructs the bias control unit 23 to measure a bias current, a waiting time, and a performance in order. Further, if a performance is low, the process control unit 24 instructs the bias control unit 23 to restart measurement.

(Operation Outline)

The magnetic storage device 1 has the measurement mode and the operating mode. Each mode is described below.

(Measurement Mode)

In a manufacturing processing of the magnetic storage device 1, bias current calibration is executed. The calibration includes three steps.

A first step is to measure a bias current for cancelling an external force applied to the actuator 7 in a predetermined track position. The current is measured at varying temperatures.

A second step is to measure a waiting time in a predetermined track position. The waiting time is measured at varying temperatures and seek distances.

A third step is to measure a performance of a seek operation based on the bias current measured in the first step and the waiting time measured in the second step. Then, a measurement result obtained with the second measurement method is compared with a performance measured with the first measurement method. If the performance is not lower than that of the first measurement method as a result of comparison, the measured value is recorded in the magnetic disk 13 and used for general operations. If the performance is lower than that of the first measurement method, the measurement is repeated.

(Detailed Description)

Figure 3:
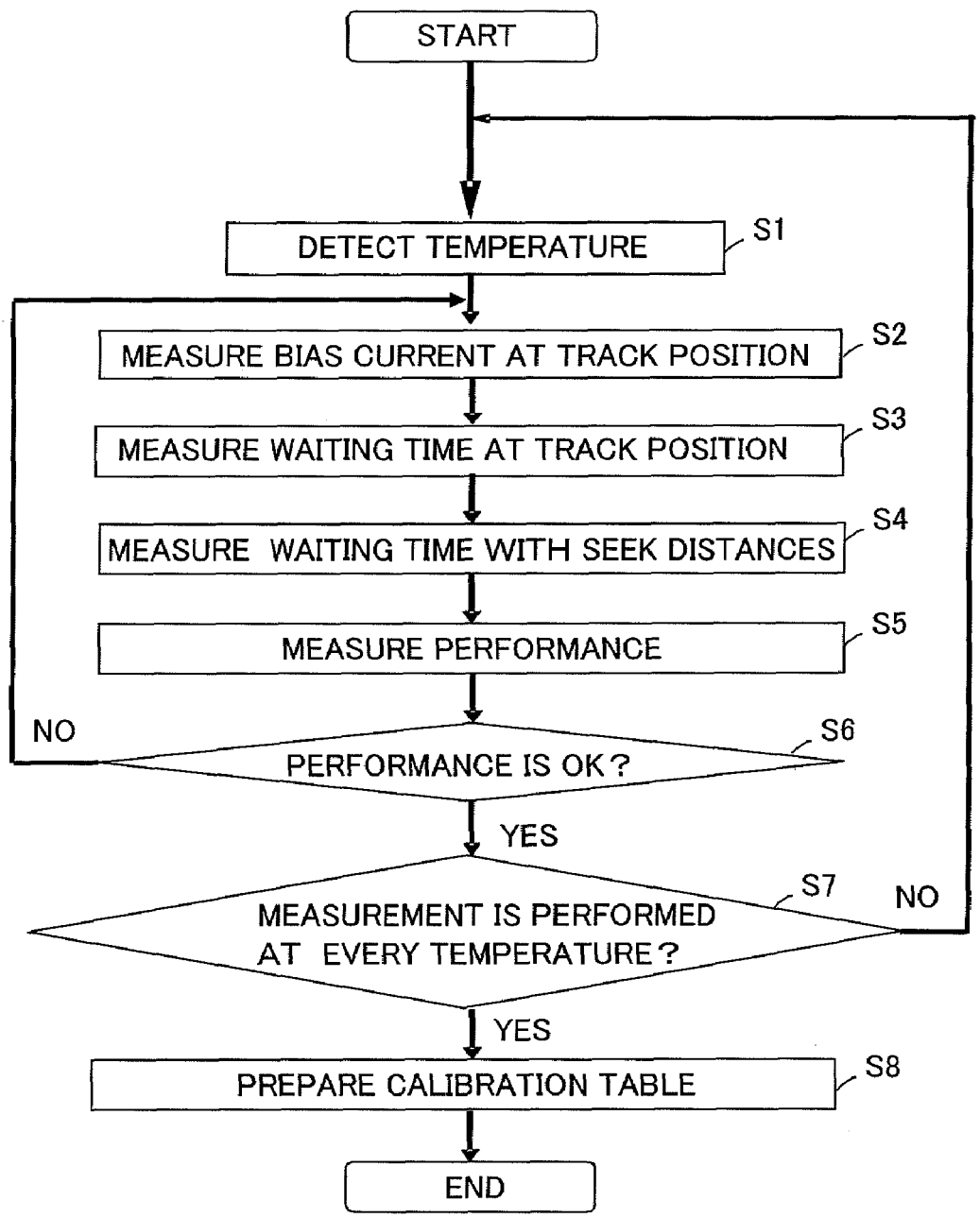
FIG. 3 is a flowchart of processing in a control unit.

FIG. 3 is a flowchart of processing in the control unit, which is an example of a flowchart of bias current calibration.

The bias current calibration can be added to general steps in a pre-shipment assembly test.

The magnetic storage device 1 is placed in a constant temperature bath, and the temperature is successively set to five sets of temperature −30° C., 0° C., 25° C., 60° C., and 85° C., for example. The process control unit 24 detects the set temperature (step S1). Next, the bias current measurement unit 41 measures a bias current after the completion of aligning the head position, in each of track positions from the outermost one to the innermost one, the tracks arranged at regular intervals (step S2).

(Description of Bias Current Measurement)

Figure 4:
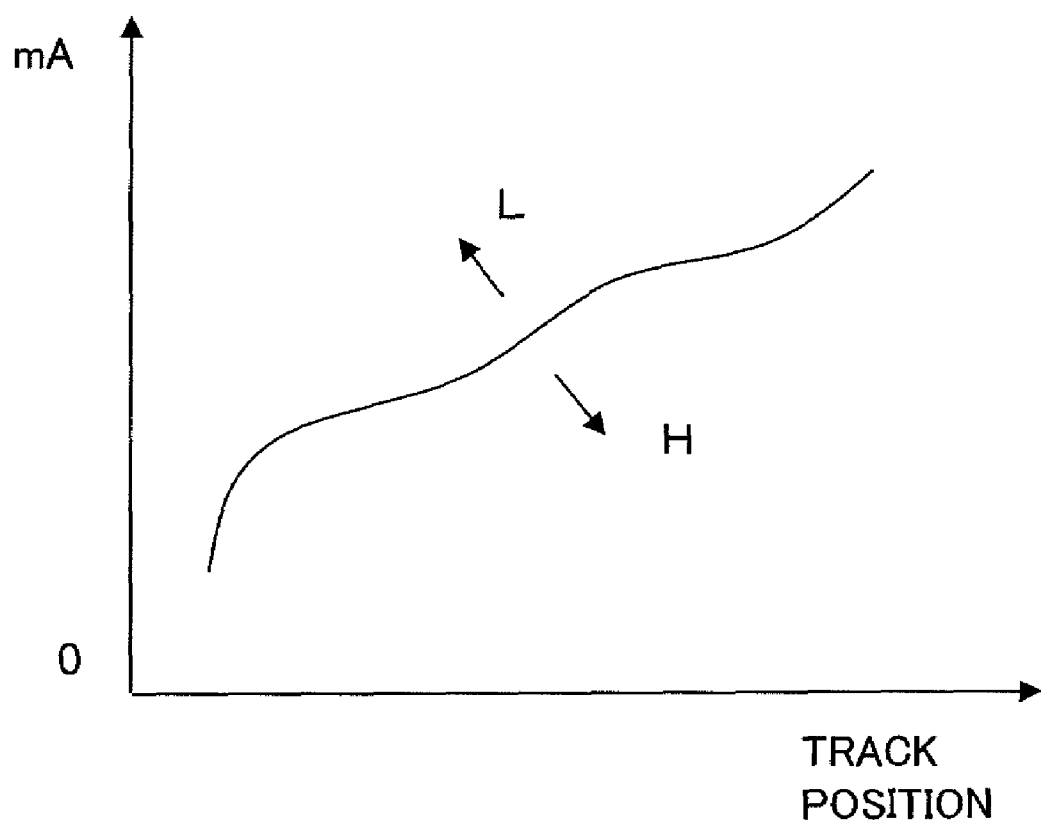
FIG. 4 is an explanatory view of a bias current.

FIG. 4 is an explanatory view of a bias current, which shows an example of a relationship between a track position and a bias current. As shown in FIG. 4, the bias current varies depending on the track position. Since the bias current varies depending on the track position, a bias current value should be measured in each track position.

Further, the bias current varies depending on a temperature. In other words, the degree to which the actuator 7 and the FPC 16 oscillate varies depending on a temperature. Therefore, a bias current is measured in a predetermined track position with varying temperature parameters.

A track position-bias current curve moves to an H side at higher temperatures and moves to an L side at lower temperatures in FIG. 4.

However, it is difficult to measure a bias current at every temperature in every track position. Thus, a bias current is measured in sample positions. Therefore, bias current values at the other temperatures or in the other track positions are obtained through linear interpolation.

As for a measurement value of a bias current, a current applied to the VCM driving unit 9 with the position control unit 22 to correct the displacement from the track center upon positional control in a target track is measured and this measurement value is stored in the memory 14.

Next, an operation of measuring a bias current in a given track is described by way of example.

Figure 5:
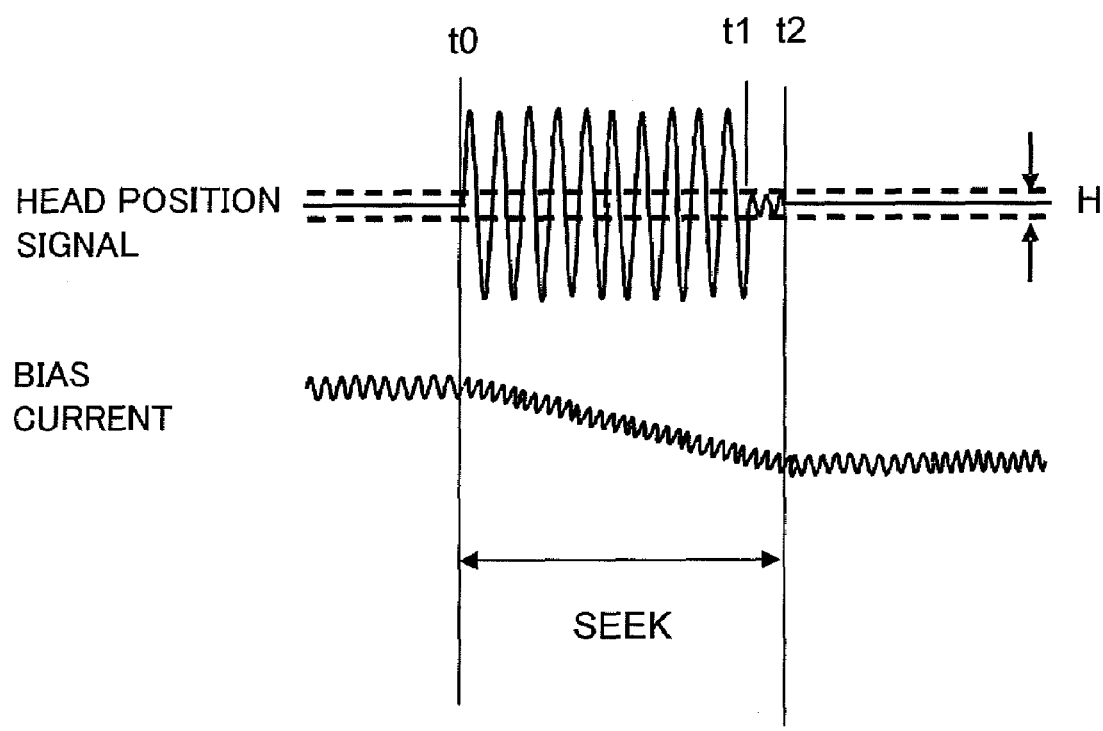
FIG. 5 is an explanatory view of a relationship between a head position signal and a bias current at a constant temperature.
Figure 6:
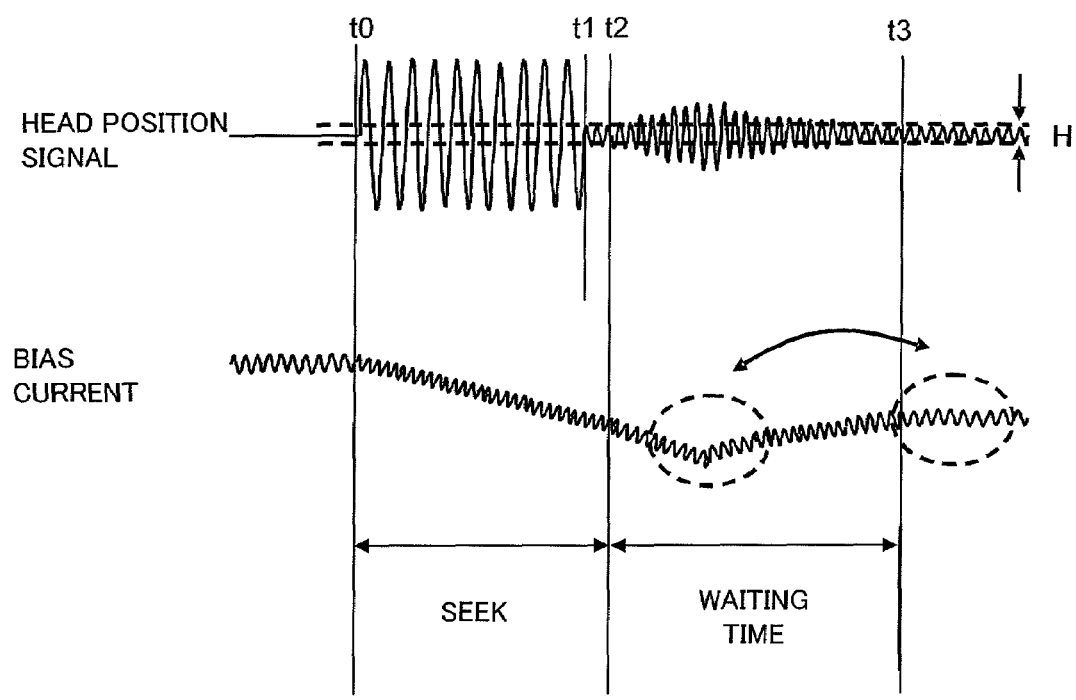
FIG. 6 is an explanatory view of a relationship between a head position signal and a bias current at a low temperature.

The last bias current value is used as a bias current value until the head moves to a target track in FIG. 5 and FIG. 6.

FIG. 5 is an explanatory view of a relationship between a head position signal and a bias current, which shows an example of the relationship at a constant temperature.

First, the head position signal and the bias current at a constant temperature are described.

At timing t0, seek is started with the initial track.

A chart from t0 to t1 shows a head position signal and a bias current during speed control processing.

Next, positional control is started at timing t1. The magnetic head 2 is assumed to reach a target track.

A chart from t1 to t2 shows a head position signal and a bias current during positional control processing.

At timing t2, the head position signal enters a predetermined slice range H, and the head is positioned to the track center, so the seek operation is terminated.

From timing t2 forward, a track-following operation is performed, and a bias current is constant. Plural bias current values are sampled in this position and averaged, and then stored in the memory 14.

FIG. 6 is an explanatory view of a relationship between a head position signal and a bias current at a low temperature.

First, a head position signal at a low temperature is described.

At timing t0, seek is started with the initial track.

A chart from t0 to t1 shows a head position signal and a bias current during speed control processing.

Next, positional control is started at timing t1. The magnetic head reaches a target track.

A chart from t1 to t2 shows a head position signal and a bias current during positional control processing.

At timing t2, the head position signal enters a predetermined slice range H, and the head is positioned to the track center, so the seek operation is terminated.

However, during a period from t2 to t3, the head position signal gets out of the predetermined slice range H again due to the oscillation. Then, at timing t3, the signal returns to the predetermined slice range.

At this time, as indicated by portions encircled with dotted lines, a bias current varies along with the deviation of the head position signal from the predetermined slice range H and then stabilizes along with the return of the head position signal to the predetermined slice range H.

Accordingly, at timing t3, the bias current is stabilized. Thus, plural current values are sampled and averaged and then stored in the memory 14.

The oscillation occurs due to characteristics of the actuator 7 and other such components at a low temperature.

Next, a waiting time is measured.

(Description of Waiting Time Measurement)

A waiting time is measured together with the bias current.

In other words, the time measurement unit 44 measures the waiting time after the completion of seek in each track position (step S3 in FIG. 3).

Then, the time measurement unit 44 monitors such head movement that a head position signal gets out of the slice range H due to vibration and then converges into the slice range H. Then, the measured time is recorded in the memory 14.

To measure the waiting time, it is determined whether the head position signal gets out of the slice range H with the track being turned round.

Further, the time measurement unit 44 measures the waiting time with varying seek distances to the track position (step S4 in FIG. 3). This is because an oscillation amount of the magnetic head 2 varies depending on a seek distance.

Figure 7:
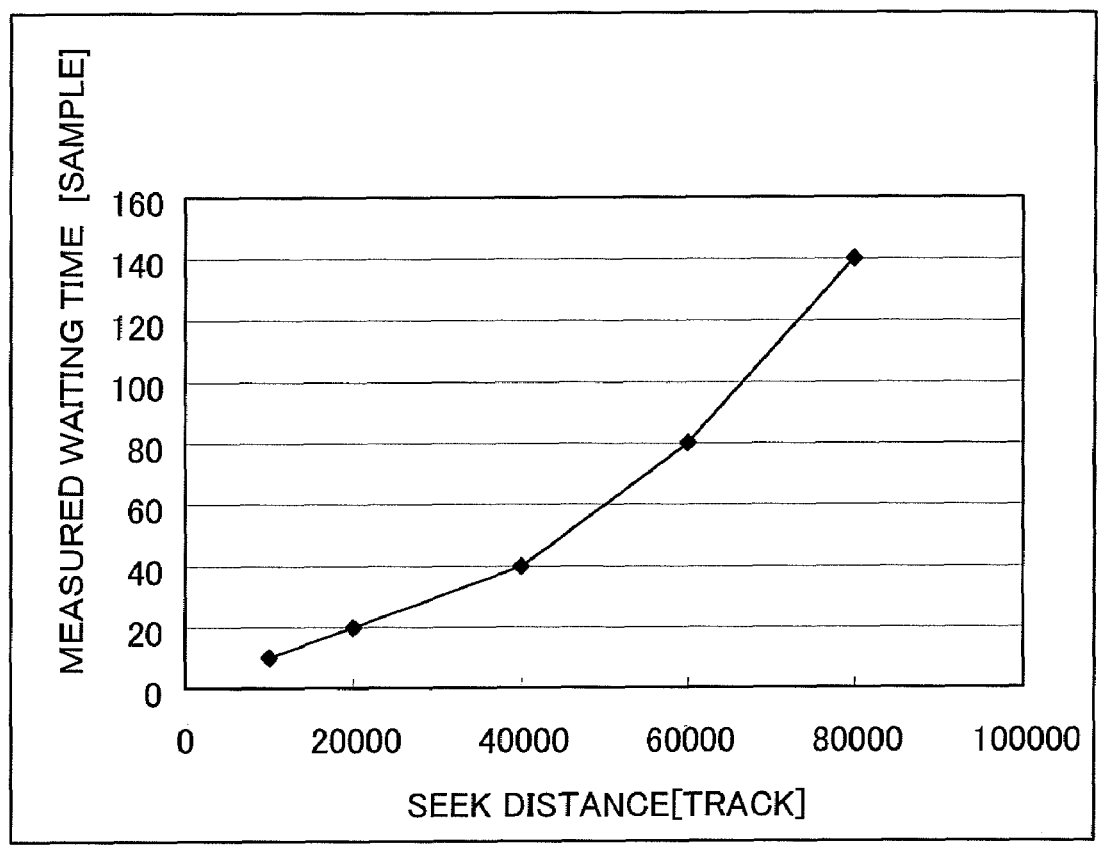
FIG. 7 is an explanatory view of a relationship between a seek distance and a waiting time.

FIG. 7 is an explanatory view of a seek distance and a waiting time, which shows a relationship between a seek distance and a waiting time at any temperature in any track.

At the time of seeking the head to 20000 tracks, a waiting time corresponds to 20 samples. However, at the time of seeking the head to 60000 tracks, a waiting time corresponds to 80 samples. Here, 1 sample value means 1 servo frame period. For example, 1 sample corresponds to 82.92 μs under the conditions of 5400 rpm and 134 servo frames.

Accordingly, if the seek distance is increased three-hold, the sample value is increased four-fold. As will be understood from the fact, the longer the seek distance, the longer the waiting time.

This is supposedly because the longer seek distance causes larger oscillation of the actuator 7 at the time of stopping at a target track.

Further, an oscillation amount of the actuator 7 varies depending on the temperature, so measurement is executed in each track position with varying temperature parameters.

Referring back to FIG. 5, a relationship between a head position signal and a waiting time at a constant temperature is described, which shows an example of the relationship therebetween at a constant temperature.

As described above, at timing t0, seek is started with the initial track.

At timing t2, the head position signal enters a predetermined slice range H, and the head is positioned to the track center, so the seek operation is terminated.

After that, the head position signal is not changed again in a track-following operation, so the waiting time is set to "0" and stored in the memory 14.

Referring back to FIG. 6, a relationship between a head position signal and a waiting time at a low temperature is described next. FIG. 6 shows an example of the relationship therebetween at a low temperature.

At timing t0, seek is started with the initial track.

At timing t1, the magnetic head 2 is sought from the initial track to a target track. Then, at timing t1, the magnetic head 2 reaches the target track and positional control starts.

At timing t2, the head position signal enters a predetermined slice range H, and the head is positioned to the track center, so the seek operation is suspended.

However, during a period from t2 to t3, the head position signal gets out of the predetermined slice range H again due to the oscillation. The, at timing t3, the head position signal returns to the predetermined slice range H.

Accordingly, a period from t2 to t3 counted with a timer is stored in the memory 14 as a waiting time.

Figure 8:
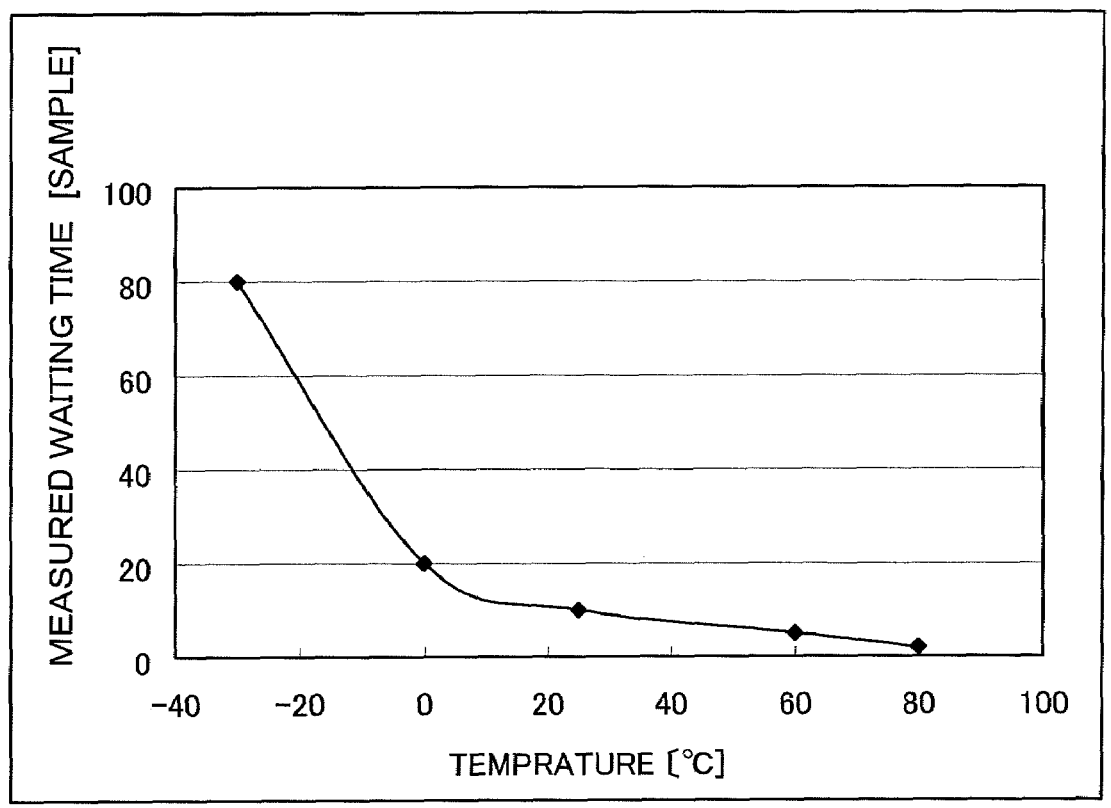
FIG. 8 is an explanatory view of a relationship between a temperature and a waiting time.

FIG. 8 is an explanatory view of a temperature and a waiting time, which shows a relationship between a temperature and a waiting time with a predetermined seek distance.

As apparent from FIG. 8, a waiting time is set longer at a lower temperature, and decreased along with a temperature rise.

For example, a waiting time corresponds to 80 samples at −30° C. A waiting time corresponds to 20 samples at 0° C. Here, 1 sample value means 1 servo frame period. For example, 1 sample corresponds to 82.92 μs under the conditions of 5400 rpm and 134 servo frames. As understood from this fact, the lower the temperature, the longer the waiting time.

In this way, bias current values measured at the manufacture stage of the magnetic storage device 1 are stored in the memory 14 in association with the temperature and the track position. Further, waiting time values are stored in the memory 14 in association with the temperature, the track position, and the seek distance.

Next, the performance control unit 33 measures a performance of the magnetic storage device 1 (step S5 of FIG. 3).

(Description of Performance Measurement)

To measure a performance of the magnetic storage device 1, an elapsed time measured with the first measurement method is compared with that measured with the second measurement method. Here, the elapsed time refers to a period from the start of the seek at the initial track until the movement to a predetermined sector on the target track.

A present value is set as the elapsed time measured with the first measurement method. The elapsed time measured with the first measurement method is referred to as a reference value.

The elapsed time measured with the second measurement method is described next.

The magnetic storage device 1 uses measured values of a bias current and a waiting time stored in the memory 14. Then, the magnetic head 2 is sought to a predetermined track in a direction from the outermost position to the innermost position. Then, the magnetic storage device 1 measures an elapsed time from the start of seek until the alignment to the predetermined track and detection of a predetermined sector.

For example, a performance is measured at a distance of ¼, 2/4, ¾, and 4/4 in the direction from the outermost position to the innermost position.

A performance measurement procedure is described below.

An elapsed time measurement unit 46 of the performance control unit 33 determines a seek distance based on a difference between the target track position and the initial track position.

Next, the elapsed time measurement unit 46 instructs the speed control unit 21 to seek the magnetic head 2 to the target track on the magnetic disk 13. After the completion of the seek, the position control unit 22 positions the magnetic head 2.

Next, after the completion of positioning, the elapsed time measurement unit 46 instructs the timer unit 45 and the bias current applying unit 42 to execute processing.

The timer unit 45 reads a waiting time from the memory 14 using the measured temperature, seek distance, and track position as a key to count the waiting time. Further, the track position includes a zone position of a zone composed of plural tracks, to which the target track belongs. The control may be simplified through zone processing.

The bias current applying unit 42 reads a bias current value from the memory 14 using the measured temperature and track position as a key.

Then, if detecting that a predetermined time elapsed, the bias current applying unit 42 applies a bias current to the VCM driving unit 9 by way of the position control unit based on the read bias current value.

After that, if a predetermined sector is detected through a track-following operation, the elapsed time measurement unit 46 measures an elapsed time from the start of seek at the initial track to the movement to the predetermined sector on the target track.

In other words, the sum of the movement time of the magnetic head 2 from the initial track to the target track, an alignment time, a waiting time until bias current application, and a waiting time until movement to a predetermined sector is measured as an elapsed time.

Next, the comparator unit 47 compares the measured elapsed time with a reference elapsed time measured with the first measurement method to check reduction of a performance (step S6 of FIG. 3).

Next, the process control unit 47 determines whether a performance is lowered. If the performance is lowered, the processing returns to step S2 to retry measurement and test. This is because the performance is temporarily lowered due to mechanistic factors.

If the performance is lowered even after a predetermined number of remeasurement processes, the magnetic storage device 1 is disposed of.

If the performance is not lowered, the process control unit 24 checks whether the measurement is performed at every temperature (step S7 of FIG. 3).

The measurement temperature is set to 5 points, for example, −30° C., 0° C., 25° C., 60° C., and 85° C. If the measurement has not been performed at every temperature, the processing returns to step S1.

If the measurement has been performed at every temperature, the process control unit 24 prepares a device calibration table (step S8 of FIG. 3). That is, the process control unit 24 prepares a final device calibration table of each seek distance, bias current value, and waiting time value in each track position at each temperature based on measured calibration values to store and save the table in a system area on the magnetic disk 13 or a nonvolatile memory as calibration information.

The process control unit 24 calculates each calibration value at temperatures other than the measured temperatures through function interpolation such as linear interpolation.

Further, a proper operation is not guaranteed at the temperature lower than −30° C. and higher than 85° C. But for this case the device is set so as to operate with the calibration values at −30° C. or 85° C. Further, as a result of linear interpolation, a slice might become large in a portion showing an abrupt temperature-dependent change. In such cases, the number of measurement temperature tables may be increased for finer measurement.

(Operating Mode)

The process control unit 24 reads calibration information obtained in the measurement mode from the magnetic disk 13 and develops the information to the memory 14 in advance.

An operation of reading/writing data from/to a predetermined sector on the target track is described. The waiting time value and bias current value measured in the measurement mode are used.

First, the process control unit 24 measures the temperature with the temperature detector 15.

Next, the process control unit 24 determines a seek distance based on a difference between the target track position and the initial track position.

Next, the process control unit 24 instructs the speed control unit to seek the magnetic head 2 to the target track on the magnetic disk 13. After the completion of seek, the position control unit 22 performs positioning.

Next, after the completion of positioning, the process control unit 24 instructs the timer unit 45 and the bias current applying unit 42 to perform processing.

The timer unit 45 reads a waiting time from the device calibration table in the memory 14 using the measured temperature and seek distance, and the target track position as a key to count the waiting time.

The bias current applying unit 42 reads a bias current value from the device calibration table developed to the memory 14 using the measured temperature and track position as a key. Then, if detecting that a predetermined time elapsed, the bias current applying unit 42 applies a bias current to the VCM driving unit 9 by way of the position control unit 22 based on the read bias current value.

After that, if a predetermined sector is detected through a track-following operation, data is read/written.

In this way, bias change that would occur after seek at various temperatures is adjusted to enable reduction in residual vibration and control for enhancing a performance within a side temperature range.

A general countermeasure against the residual vibration is to use components (expensive materials) or motor that hardly causes a bias change due to a temperature change. In this embodiment, however, the residual vibration can be reduced only through calibration, and thus a cost can be advantageously saved.

Further, the components involve production tolerance, which cannot be suppressed without calibration. The problem of production tolerance can be solved through the calibration.

The magnetic storage device is described by way of example, but the present technique is applicable to a magneto-optical storage device using an optical disk or a magneto-optical disk.

What is claimed is:

1. A storage device for driving an actuator equipped with a head by a driving unit to seek the head to a target track on a storage medium to position the head to the track, comprising:

a storage unit for storing, in advance, a value of a waiting time until application of a bias current to the driving unit to eliminate an external force applied to the actuator after completion of positioning, and a value of the bias current to be applied to the driving unit after an elapse of the waiting time, in association with a track position;

a timer unit for reading the value of the waiting time from the storage unit and counting the elapse of the waiting time; and a bias current applying unit for reading the value of the bias current from the storage unit and applying the bias current to the driving unit after the elapse of the waiting time.

2. The storage device according to claim 1, further comprising:

a time measurement unit for measuring the waiting time until a head position converges to a predetermined positional error range from the completion of positioning if the head position gets out of the predetermined positional error range due to a residual vibration that occurs after the completion of positioning the head to the target track, and storing the measured waiting time in the storage unit; and a bias current measurement unit for measuring the bias current for keeping the head in a position where the head converges to the position error range if the head converges to the position error range, and storing the measured bias current in the storage unit.

3. The storage device according to claim 2, wherein the time measurement unit measures the waiting time with varying seek distances to the target track.

4. The storage device according to claim 3, wherein the waiting time and the bias current are measured at a plurality of temperatures.

5. The storage device according to claim 4, further comprising:

an elapsed time measurement unit for measuring an elapsed time from start of the seek at a first track to a predetermined sector on the second track, the elapsed time including sum of time from start of the seek at the first track to completion of positioning to the second track and the waiting time until application of the bias current to the driving unit after completion of positioning and time until detection of the predetermined sector after the elapse of the waiting time;

a comparator unit for comparing the measured time with a preset reference value; and a measurement resuming unit for resuming measurement if a comparison result shows that the measured time exceeds the reference value.

6. The storage device according to claim 4, wherein a calibration value is calculated for temperatures other than the measured temperature through function interpolation.

7. The storage device according to claim 4, wherein the measured bias current and waiting time are stored in the storage medium as a calibration value in association with the temperature, the track position, and the seek distance.

8. A seek control method for a storage device including a storage unit for storing, in advance, a value of a bias current for eliminating an external force applied to an actuator equipped with a head, and a value of a waiting time until application of the bias current to a driving unit for driving the actuator, in association with a track position, comprising the steps of:

driving the actuator to control movement of the head to a target track on a storage medium;

positioning for converging into a predetermined range a positional difference between a track center and a head position upon the head reaching to the target track;

counting the waiting time read from the storage unit after completion of the positioning process; and applying the bias current read from the storage unit to the driving unit after the elapse of the waiting time.

* * * * *